US012608437B2

(12) United States Patent
Golubovsky et al.

(10) Patent No.: US 12,608,437 B2
(45) Date of Patent: *Apr. 21, 2026

(54) SYSTEMS AND METHODS OF COMMUNICATING ELECTRONIC DATA TRANSACTION UPDATES TO CLIENT COMPUTER SYSTEMS

(71) Applicant: NASDAQ INC., New York, NY (US)

(72) Inventors: Leo Golubovsky, Franklin Lakes, NJ (US); Michael Wood, New City, NY (US); Jonathan Wakefield, Chatham, NJ (US)

(73) Assignee: NASDAQ, INC., New York, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/596,424

(22) Filed: Mar. 5, 2024

(65) Prior Publication Data

US 2024/0214473 A1      Jun. 27, 2024

Related U.S. Application Data

(63) Continuation of application No. 18/055,147, filed on Nov. 14, 2022, now Pat. No. 11,943,325, which is a continuation of application No. 17/149,433, filed on Jan. 14, 2021, now Pat. No. 11,516,316, which is a continuation of application No. 16/017,609, filed on Jun. 25, 2018, now Pat. No. 10,924,592.

(Continued)

(51) Int. Cl.
G06Q 40/04          (2012.01)
G06F 16/958         (2019.01)
G06F 21/62          (2013.01)

H04L 9/40          (2022.01)
H04L 69/18          (2022.01)

(52) U.S. Cl.
CPC ........ G06F 16/958 (2019.01); G06F 21/6218 (2013.01); G06Q 40/04 (2013.01); H04L 63/0414 (2013.01); H04L 69/18 (2013.01)

(58) Field of Classification Search
CPC ............................... G06Q 40/04; H04L 69/18
See application file for complete search history.

(56) References Cited

U.S. PATENT DOCUMENTS

2005/0240510 A1    10/2005  Schweickert
2008/0097887 A1 *   4/2008  Duquette ............... G06Q 30/06
                                                          705/37

(Continued)

OTHER PUBLICATIONS

Nasdaq, "Market Model: Nasdaq Nordic: INET Nordic" <https://www.nasdaq.com/docs/INET-Nordic-Market-Model.pdf>, posted Jan. 18, 2016.

*Primary Examiner* — Lesa M Kennedy
(74) *Attorney, Agent, or Firm* — Nixon & Vanderhye, PC

(57) ABSTRACT

A distributed computer system is provided that includes a storage system and at least one hardware processor. The storage system stores a data structure that includes a plurality of pending data transaction requests. Data transaction requests are processed to add, modify, or remove from the data structure. Multiple update messages for how the data structure is updated are generated and then delivered to clients via different communication paths, which have different latency. Some update messages are delivered via one communication path, but not another communication path.

20 Claims, 5 Drawing Sheets

Related U.S. Application Data

(60) Provisional application No. 62/524,404, filed on Jun. 23, 2017.

(56) References Cited

U.S. PATENT DOCUMENTS

| 2013/0304846 | A1 | 11/2013 | Jensen |
|---|---|---|---|
| 2015/0032590 | A1 | 1/2015 | Fay |
| 2016/0006837 | A1 | 1/2016 | Reynolds |
| 2017/0004563 | A1 | 1/2017 | Noviello et al. |
| 2018/0276751 | A1 | 9/2018 | Kavanagh |
| 2018/0324250 | A1 | 11/2018 | Fiske |
| 2018/0375966 | A1 | 12/2018 | Golubovsky et al. |
| 2021/0136183 | A1 | 5/2021 | Golubovsky et al. |
| 2023/0070103 | A1 | 3/2023 | Golubovsky et al. |

* cited by examiner

SYSTEMS AND METHODS OF COMMUNICATING ELECTRONIC DATA TRANSACTION UPDATES TO CLIENT COMPUTER SYSTEMS

CROSS REFERENCE TO RELATED APPLICATION(S)

This application is a continuation of U.S. patent application Ser. No. 18/055,147, filed Nov. 14, 2022, now allowed; which is a continuation of U.S. patent application Ser. No. 17/149,433, filed Jan. 14, 2021, now U.S. Pat. No. 11,516, 316, issued Nov. 29, 2022; which is a continuation of U.S. patent application Ser. No. 16/017,609, filed Jun. 25, 2018, now U.S. Pat. No. 10,924,592, issued Feb. 16, 2021; which claims priority to U.S. application Ser. No. 62/524,404, filed Jun. 23, 2017, the entire contents of each of which are hereby incorporated by reference.

TECHNICAL OVERVIEW

The technology herein relates to computing systems that match data transaction requests. More particularly, the technology herein relates to communicating updates regarding the processing of such data transaction requests.

INTRODUCTION

In computing technology, reporting the processing results for data transaction requests can be as important as the underlying processing. This issue can be thought of as the computing equivalent of the philosophical question "if a tree falls in a forest and no one is around to hear it, does it make a sound?" Importantly, in terms of computing processing, this issue is not just a philosophical question, but is a real problem that consistently needs to be addressed when new systems and processes are being developed and deployed.

For example, a networked aircraft may include a local processor for controlling engine thrust or wing shape. But the ultimate decision for what commands should be issued may be controlled by a remotely located computer system. An issue arises when the information available to the local processor (e.g., the speed of the aircraft) is different from that available to the remote system. In other words, what the remote system "thinks" is current is not actually the current state of the system that it is controlling. The time difference between the two systems is sometimes referred to as latency—the amount of time it takes for information to be transmitted from one system to another.

Various techniques have been developed to address these types of problems. Some techniques include using complex prediction models that predict how the remote system should perform. However, such algorithms are not omniscient. Other techniques may seek to decrease the latency between the two systems. However, the returns for such decreases can be very small because of the underlying physical constraints (e.g., the speed of light).

Accordingly, in these, and other areas of computing technology, new techniques are continually sought after. In particular, techniques related to how updates for data processing performed on one system may be transmitted to other remote systems.

SUMMARY

In certain example embodiments, a distributed computer system includes a transaction processing computer system, a gateway computer system, and a session manager computer system. The session manager is programmed to accept incoming data transaction requests, start a session, and select which of plural different gateway computer systems to send the request to. Each transaction processing computer system has a corresponding gateway computer system.

When the transaction processing computer system receives new data transaction requests it may perform a matching process against other data transaction requests. In certain instances, the matching process may be performed using private (hidden) that can affect how the corresponding data transaction request is sorted into the ordered list and/or how the data transaction request is matched against other data transaction requests. In certain example embodiments, regular data transaction requests (e.g., those with no private attributes) are also received and processed.

When updates regarding the state of the transaction processing system are communicated to external client computer systems, one communication pathway may provide information that includes private details of the state of the transaction processing system and another communication pathway may only include "public" details of the transaction processing system. The communication pathway that includes the private information may be slower than the pathway that only includes the public information.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Client computer systems communicate with one or more transaction processing systems using different communication pathways (e.g., different communication protocols). Submissions of new data transaction requests to transaction processing systems can be performed using one of at least two different communication protocols. A first communication protocol is slower than the second. How the transaction processing system processes new data transaction requests can be based on which of the protocols has been used for the submission process. In particular, those data transaction requests submitted with the slower protocol may be processed by taking into account private attributes (in addition to public attributes) while those requests submitted with the faster protocol may only be processed by using public attributes.

Updates regarding how data transaction requests have been processed by a given transaction processing system can also be performed by using one of multiple different communication protocols. In certain examples, the type of information included in an update for a given protocol is based on whether the protocol is "fast" or "slow." A slower protocol may include additional private attribute information related to the update. In contrast, an update sent out via the faster protocol may include only public attribute information.

In certain examples, a slower protocol may include using a session manager component that handles communications from a given client to a given transaction processing system and updates from the given transaction processing system to the given client. In other words, this protocol may handle data transaction requests submissions and data feed updates. In certain examples, a faster submission protocol may use the FIX messaging standard. A faster update protocol may use the ITCH messaging protocol.

FIG. 1

Figure 1:
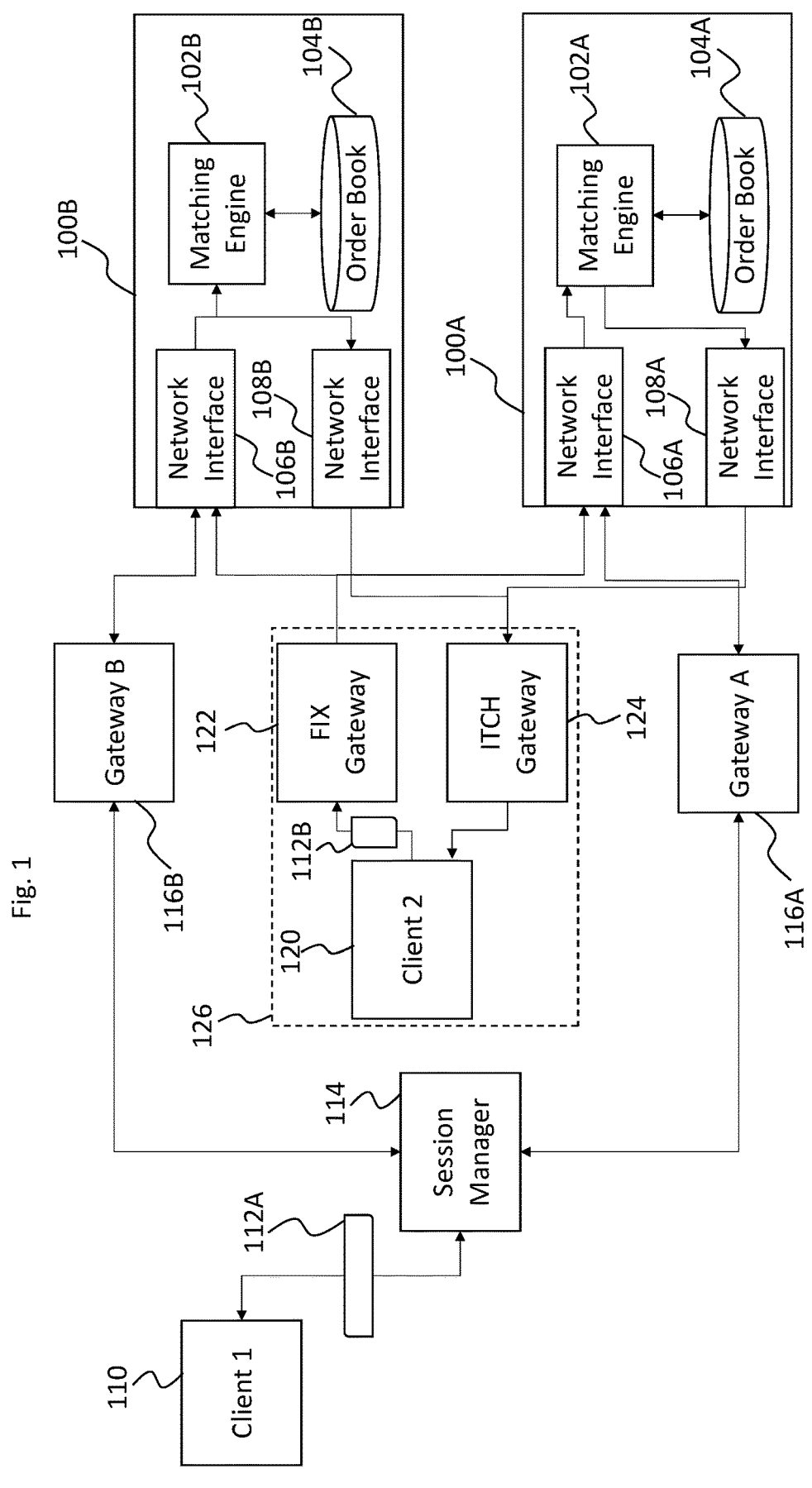
FIG. 1 illustrates a non-limiting example function block diagram of a computer-implemented transaction processing system that client systems can communicate with using different example communication protocols.

By way of introduction, FIG. 1 illustrates a non-limiting example function block diagram that includes computer-implemented transaction processing system(s) (100A and 100B) that communicate with client systems (110 and 120) using different communication protocols.

Transaction processing systems 100A and 100B may be automated exchange computer systems ("exchange"(s) hereafter). Exchange 100A includes a matching engine 102A, order book 104A, and network interfaces 106A and 108A. Similarly, exchange 100B includes matching engine 102B, order book 104B and network interfaces 106B and 108B. As discussed herein, the similarly situated components of respective exchanges 100A and 100B may operate in similar manners and when one component is discussed (matching engine 102A), the described functionality may apply to the other component (matching engine 102B). In certain examples, different exchanges may process different types of resources (e.g., in a security example, different types of bonds may be handled by respectively different exchanges). In certain examples, there may be 10s or 100s of different exchanges included in an overall distributed computer system that handles data transaction requests. For ease of explanation, two separate exchanges are shown in FIG. 1—but systems that implement one or more than two exchanges are contemplated. Exchanges may be implemented on one or more computer systems; such as the system shown in FIG. 4.

Matching engine 102A can be a combination of hardware (e.g., a hardware processor, such as a central processing unit) and software or just hardware (e.g., a suitably designed application-specific integrated circuit or field programmable gate array). The matching engine 102A handles incoming data transaction requests (e.g., data transaction request 112A or 112B) and attempts to match incoming data transaction requests against those data transaction requests stored in the electronic order book 104A. In certain example embodiments, in addition or alternatively to matching incoming data transaction requests, the matching engine 102A attempts to match data transaction requests already stored in the electronic order book 104A (e.g., it attempts to match two "resting" or "passive" data transaction requests). In certain examples, market conditions (e.g., the state of the order book for a particular instrument) may change and cause two data transaction requests that were previously stored in the order book 104A to match (or cross). In response to such a change, the matching engine 102A may identify two data transaction requests that can match and trigger the execution (e.g., trade) between those two data transaction requests.

Electronic order book 104A can be a data structure (e.g., a database, flat file, list, etc . . . ) that holds multiple entries in electronically accessible memory (e.g., RAM, cache, registers, hard disk drives, etc . . . ). Typically, an electronic order book 104A has two sides, side X and side Y, which can be bid and offer/ask or buy and sell sides for the same instrument in the same electronic order book. The two sides of the order book may be represented as a list pair data structure (one list for the buy side and one list for the sell side). In certain examples, each list of the list pair may be sorted. Further discussion of order books is described in U.S. Publication No. 2017/0004563, the entire contents of which are hereby incorporated by reference.

Data transaction requests are initially submitted by client systems (110 and/or 120). Client systems can include personal computers, mobile devices, automated computer systems, and the like. Generally, client systems 102 can include any computer system programmed to interface with exchange(s) 100A/100B (or components associated therewith) for the purpose of submitting data transaction requests.

Data transaction requests include information that can specify an "order" (also called an electronic order herein). Orders are requests for one or more data transaction systems to take a given action (e.g., buy/sell) with respect to an identified resource (e.g., a ticker symbol). For ease of description, "orders" (or electronic orders) are used herein to also refer the submitted "data transaction requests."

Electronic Orders 112A and 112B are submitted in the form of electronic data messages (e.g., data messages constructed according to a communication protocol) for a corresponding order (e.g., a data transaction request to match the order to a pending, or future, order). The electronic order may specify a client ID that identifies the client sending the request (e.g., a company, person, etc . . . ), an instrument ID that identifies a particular instrument (e.g., a ticker symbol or the like), transaction type ID that may identify, for example, whether the request is associated with a sell or buy instruction, an order attribute that specifies whether this a regular order, a discretion order, a midpoint order, or the like, a quantity value that indicates the quantity of the order, a MinOrder value that indicates a minimum order amount that this order can be matched against, and a price value that indicates a particular price for the order subject to the data transaction request. In certain examples, other fields may be defined in the electronic order and/or some may be optional.

In certain examples (e.g., in the case of a discretion order), an electronic order may also specify the price for the displayed quantity of the order, the quantity to be publically shown, a number of discretion ticks for the hidden portion (a private attribute of the order) of the order (e.g., tick amount that is less than, such as a fraction of, a standard screen tick quantity), the total size of the order (a private attribute of the order), and the amount of the order that is eligible to be matched with discretion (a private attribute of the order). In certain examples, the electronic order may specify a total size value and a publically visible value (e.g., such that the size of the private part of the order is the difference between the total size and the visible value). In certain examples, the electronic order may specify a hidden size value (a private attribute of the order) and a publically visible value (e.g., such that the total size of the order is the sum of the hidden and visible values). In certain examples, an order may specify the amount of the order that may be matched at the price allowed by the discretion. This amount may be less than the total amount of the order. Thus, for example, a discretion order may display 25, have a total quantity of 1000 (e.g., 975 of the 1000 is a private attribute), and have 500 of that 1000 eligible to be traded at 1 discretion tick from the displayed or publically broadcast price. In certain examples, a private attribute includes a number of discretion ticks. Based on this value and the public price of the order, a discretion price can be calculated.

As discussed herein, public refers to information (e.g., price information, size information, trade information, etc . . . ) that is generally made available to third parties via an electronic data feed (e.g., via ITCH gateway 124). The parties that receive this information are generally not associated with the order and/or trade. This aspect may also be referred to as "displaying" information to such third parties.

Conversely, private (sometimes also referred to as hidden or dark herein) information generally refers to information for which the details are not (at least initially) provided to such third-parties. In certain instances, private information includes information regarding just the existence of private attributes of an order. Private information is made available to the parties associated with the trade, order, match, etc . . . . This also includes the exchange itself, third party regulatory systems, and the like. Thus, for example, an order may have a public price (e.g. that is "displayed" or provided to third parties), a private price (e.g. that is not expressly displayed or provided to third parties), or a combination thereof (e.g., a public price value and a private price value). In certain examples, when a match is determined between a "public" price and a "private" price, such match information is not made public. The "public" information in such a case is transformed into private information. It will be appreciated that discretion type orders may have private attributes (e.g., private discretion attributes) and midpoint type orders may also have private attributes (e.g., private midpoint attributes). Other order types with private attributes may be similarly used.

In certain examples, private information regarding orders may be provided via one of a plurality of communication protocols used to deliver updates from exchange(s) to client computer systems—including client computer systems that are controlled by third parties (e.g., entities that are not a party to a trade or match, or other action to an order book). In certain examples, orders may only match against resting orders by using private information if the submitted order is marked as being from a specific source type. Examples of such matching are shown in FIG. 6 of U.S. Publication No. 2017/0004563 where orders may be marked as being from different types of clients via a specific data field of the order. This may include clients that access the exchanges via certain types of protocols, but not others. For example, orders may be flagged as being from a "GUI user" or a SessionManager user. A matching engine may use or not use private attributes as part of a matching process based on the order being submitted from a GUI user or a SessionManager.

There are different communication protocols that clients can use to connect/communicate with exchanges 100A/100B. A first communication protocol (e.g., included in a first communication path) uses session manager 114 and gateways (116A and 116B) that respectively correspond to individual exchanges (100A and 100B). A second communication protocol (e.g., included in a second communication path) uses gateways (e.g., FIX gateway 122) that determine which exchange (among exchanges 100A and 100B) an incoming order (e.g., 112B) should be routed.

For the first communication protocol, as shown in FIG. 1, client 110 communicates with session manager 114. Session manager 114 is generally responsible for managing a "session" that client 110 has with one or more of the exchange systems shown in FIG. 1. This includes handling orders submitted by client 110 and providing information to client 110 from the various exchanges (e.g., market data feed information).

With the first communication protocol, client 110 generates a new order and submits it to exchange(s) 100A/100B via the session manager 114. In certain examples, the session manager 114 receives the new order 112A and then determines, based on the contents of the order and/or associated information, where order 112A should be sent. Specifically, the session manager determines if order 112A should be sent to exchange 100A via gateway 116A or should be sent to exchange 100B via gateway 116B. Gateways 116A and 116B are each associated with a corresponding exchange— 100A and 100B—such that exchanges 100x may have a 1-to-1 relationship with gateways 116x.

In certain example embodiments, the session manager 114 may annotate a newly received order with additional information indicating that the order has been received via the session manager. For example, a data field of the order may be updated with a value that indicates that this order is being submitted through the session manager 114. As discussed herein, this information may be used to determine how the order may be processed by the corresponding exchange In general, session manager 114 and gateways 116A/116B are separate computer systems that communicate with one another. Thus, session manager 114 may be implemented on a first computer system that communicates with gateways 116A/116B that are implemented on separate computer systems (e.g., separate ones of the computer system shown in FIG. 4). However, in certain examples, session manager 114, gateways 116A/116B, and/or exchanges 100A/100B may be separate components (e.g., computer processes) implemented on the same physical computer system. In certain examples, each of the components may be implemented on different virtual machines that may or may not be running on the same underlying hardware as other components.

In any event, orders that are received by gateways A or B are then transmitted to the respective exchanges 100A or 100B where the network interface (106A and 106B) of those exchanges receive the new order. The new order is then passed to the matching engine (102A or 102B) of the exchange that performs a matching process as discussed herein. In certain examples, the matching process results in a match being found and subsequent executed. In other examples, the matching process results in a new order being added to the order book.

Additionally, whenever there is an update to the state of the order book (e.g., 104A or 104B) of an exchange (e.g., a new order is added, an order is canceled, modified, etc . . . ), an electronic data message may be generated that is based on how the order book has been updated. The electronic data message may be transmitted back to client 110 via network interface 108A/108B, the gateway 116A/116B, and the session manager 114. Such information may include updates to the order book caused by orders from other clients interacting with the order book and/or updates or confirmations that have been generated based on those orders submitted by client 110. For example, if a first client submits an order that is added to the order book, an update may be transmitted to a second client that indicates that the order book includes that new order.

In certain example embodiments, updates that are provided via this first communication path may include information that is "private" in addition to information that is public. For example, if a first client submits a new order of quantity 1000@100 that is added to the order book, where only 100 of that 1000 is "public", information regarding the full 1000 may be included in the electronic data message that is transmitted out via this communication path. As explained herein, the "private" information may specify that additional quantity exists—but without reference to an exact number, or may include a range (e.g., that between 1000 and 10000 additional quantity is available), or may provide the exact amount that is available.

In contrast to the first communication protocol that makes use of the session manager 114, the second communication protocol uses a general gateway 122 and does not include the session manager component in its communication pathway. General gateway 122 may implement the FIX (Financial Information exchange) messaging protocol for sending and receiving messages to/from an exchange. Accordingly client 120 may generate an electronic data message (e.g., using the FIX messaging protocol) 112B and submit that message to gateway 112. The message may be to submit a new order, modify and existing order, cancel an existing order, or request information from the exchange regarding resting orders.

Gateway 112 receives the message and determines which of the exchanges (e.g., among 100A and 100B) will receive the message. In other words, gateway 122 may include functionality that is similar in nature to that found in the session manager 114 and gateways 116A/116B. Accordingly, the newly received message may be routed to the appropriate exchange system based on the contents of the new data transaction request 112B and/or other factors.

A third communication protocol may be used to communicate data regarding the state of the order book to clients.

In particular, an electronic data feed gateway 124 may communicate with network interfaces 108A/108B to provides updates on the state of the order book(s) to client 120. In certain examples, the electronic data feed gateway 124 may implement the ITCH protocol. Typically, with this third communication protocol only "public" data will be included in electronic data feed updates. Thus, for example, for the above submitted order with 1000 total quantity, of which only 100 is "public," only the 100 will be include in updates provided via gateway 124. In certain examples, private information may be included in the third communication protocol. In certain examples, the level of private information provided via the first communication protocol may be greater than the level of information provided via the third communication protocol. For example, the third communication protocol may generally indicate that additional quantity is available for a given order (or at a price level) while the first communication protocol includes information on the exact amount of quantity that is available.

In certain examples, client 120 and gateways 122 and 124 may be co-located (as indicated by dashed line 126) with one another (e.g. within the same data center). In certain examples, client 110, session manager 114, and gateways 116A and 116B may also be co-located with one another. In certain examples, exchanges 100A and 100B may be co-located with these components. It will be appreciated that even when the session manager, gateways, and clients are all co-located that the first communication protocol is generally slower than the second or third communication protocols discussed above.

In certain examples, the same client computer system may use multiple different communication protocols. For example, client 110 may also be in communication with gateway 122 and gateway 124. Accordingly, as the communication protocols operate at different speeds, data regarding the same updates may be received at client 110 at different times. In other words, the "state" of the order book for an exchange may be different depending on what communication protocol is being used by a given client. Furthermore, order submission times (e.g., the time from when client 110 transmits a new data transaction request to the time it "hits" the matching engine of an exchange) may be different.

FIGS. 2A-2B

Figure 2A:
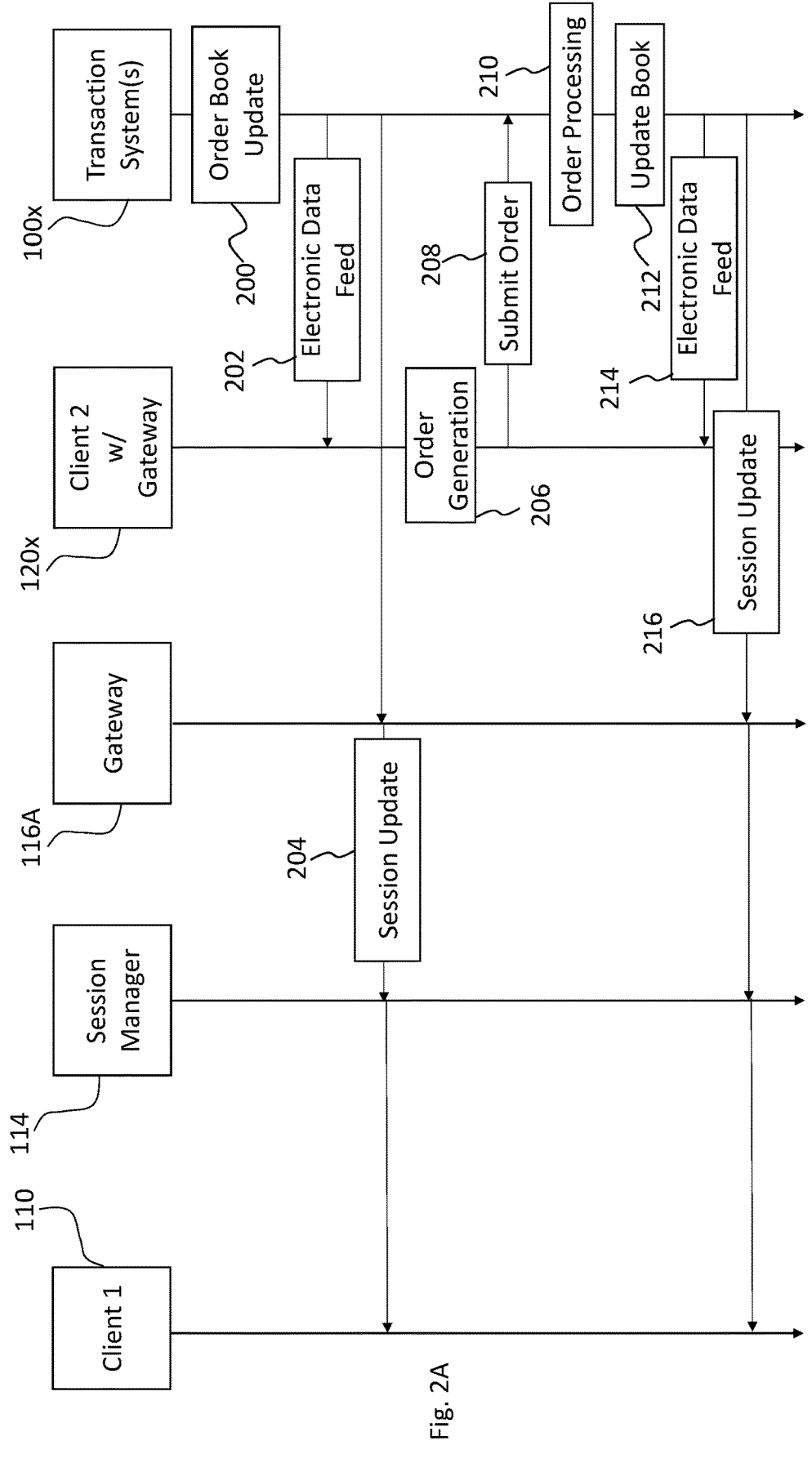
FIGS. 2A-2B shows a signal diagram of how data transaction requests from clients and how updates back to clients are communicated according to certain example embodiments.
Figure 2B:
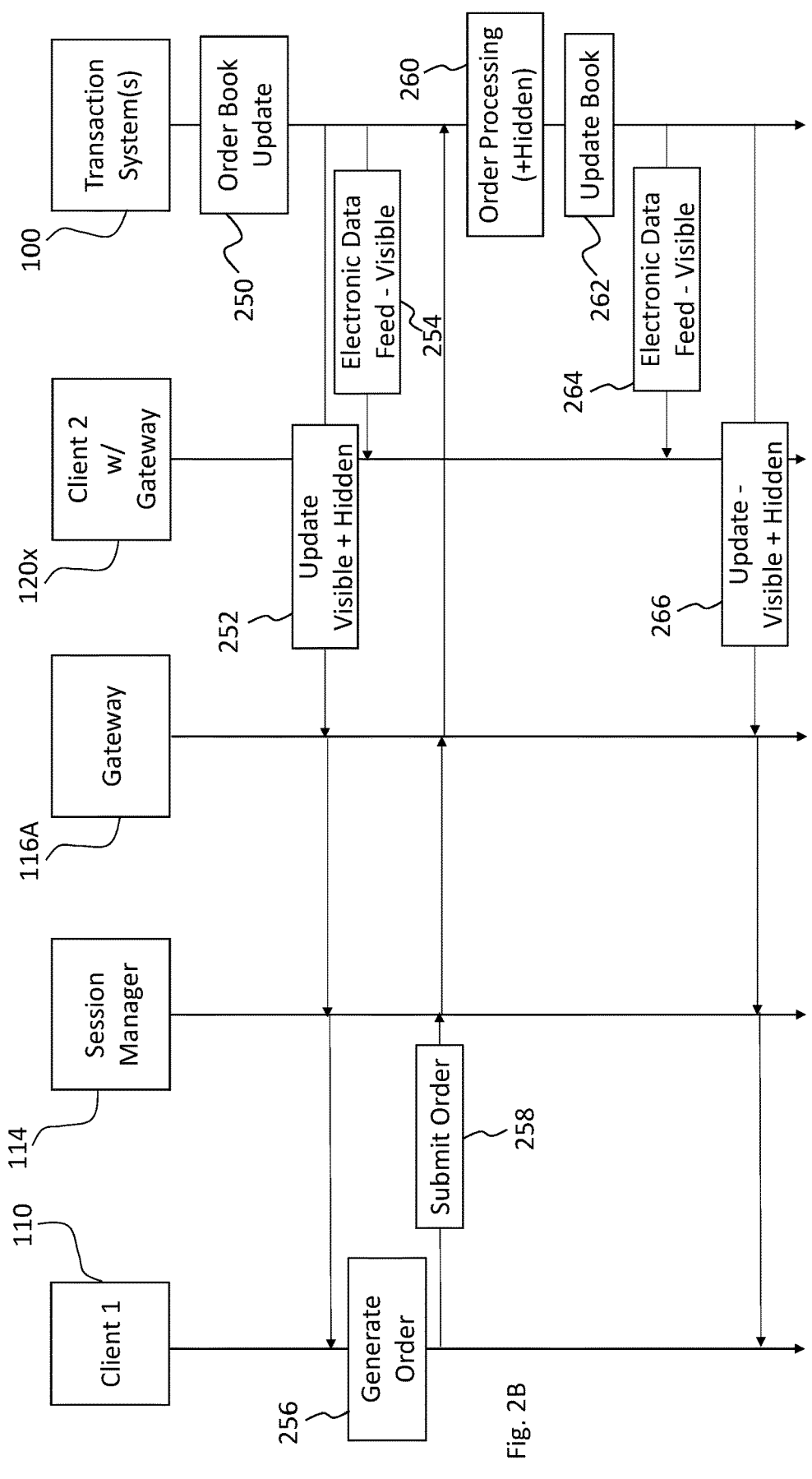

FIGS. 2A-2B shows a signal diagram of how data transaction requests from clients 110 and 120 and how updates back to those clients are communicated according to certain example embodiments.

At 200, an update to the order book occurs on one of the exchanges 100$x$ (A or B). For example, a new order is added to the order book or an order has been removed from the order book (e.g., because it was matched against an incoming order).

As a result, an electronic data feed update is sent out at 202. This electronic data feed is provided via gateway 124 to all clients (including client 120 that subscribes to that data feed). As discussed above, typically, the information provided via this data feed will only include information that is classified as "public" data. Thus, hidden size, price, discretion attributes, or other private or hidden information will typically not be included in the data messages that are published via this data feed.

At 204, information may also be transmitted out via the first communication protocol. In particular, those clients that have an active session with the exchange and/or order book for which the update relates may receive a session update message 204 that includes information regarding the order book update. The update message may be routed through gateway 116A and session manager 114 before being received by client 110. As noted herein, the session update message 204 may include private or hidden attribute information regarding orders that are in the order book. However, in this particular example, the update that triggered the session update 204 did not contain any private information (e.g., the update to the order book was based on lit or publically visible order information).

At 206, client 120 may generate an order that is to be submitted to exchange 100x. The order may be generated based on the information received via the electronic data feed at 202. As discussed herein, by the time client 2 has generated (and submitted) an order, the session update message 204 may still be "in-flight" and in the process of being delivered to client 1.

At 208, client 2 submits an order to exchange 100x via gateway 122. In certain examples, when clients submit orders via gateway 122 (e.g., a FIX gateway) the order may be automatically marked as such (e.g., that the order was submitted using the FIX messaging protocol).

At 210, exchange 100x processes the order submitted at 208. Whether or not a submitted order can match against the private attributes of other resting orders may be determined based on whether or not the order has been submitted via FIX or via the Session manager. Specifically, in certain examples, orders submitted via FIX may not match against the private data of resting orders, while orders (as discussed below) that are submitted via the session manager 114 may match against such data.

Figure 3:
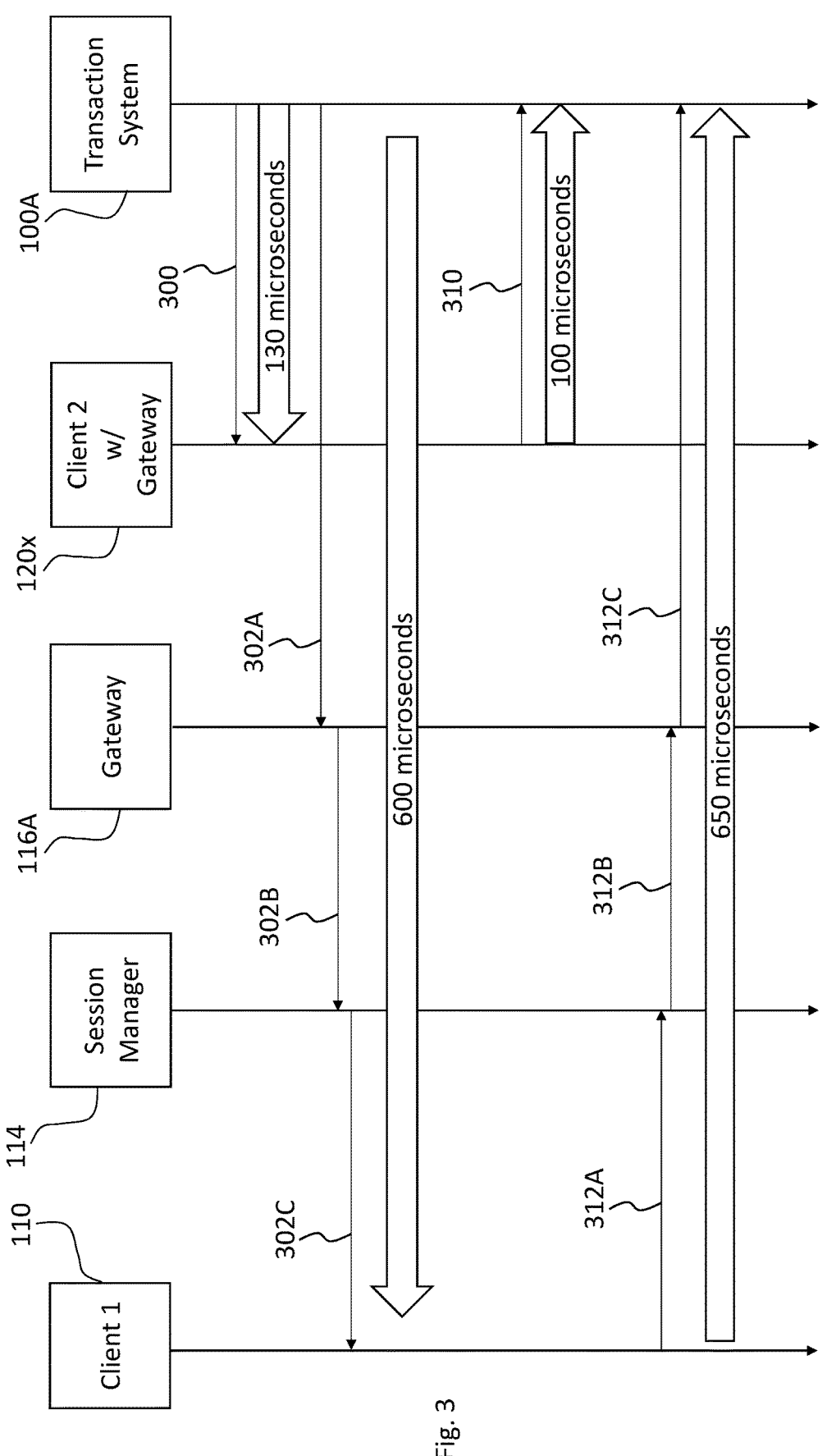
FIG. 3 is a signal diagram that illustrates example timings of two example communication protocols that are used according to certain example embodiments.

At 212, as a result of processing the newly submitted order, the order book of the corresponding exchange is updated and that update is then transmitted out via the ITCH electronic data feed at 214 and the session manager at 216. As shown in FIG. 3, the time between 200 and 212 may be less than the time it takes for session update 204 to arrive at client 110. In other words, the "state" of the order book represented by 204 may be stale or old by the time client 110 receives the update message. Of course, client 110 may also be configured to receive updates via gateway 124.

FIG. 2B shows an example of how session manager based orders may be processed.

At 250, an update to the order book occurs and those updates cause updates to be propagated out to clients via different communication protocols at 252 and 254. Unlike the update that was triggered in FIG. 2A, this update includes order information that is both public data and private data. For example, the update to the order book may include information regarding an order added to the order book at a displayed price of 101 (e.g., public data) that also included two ticks of discretion (e.g., private data).

At 252, the information is propagated via gateway 116A and session manager 114 to client 110. The update includes both the publically display price for the order and the amount of discretion that the order can trade at (or simply an indicator that it can trade with discretion—but not the price level at which that would be). This information is transmitted from the exchange 100x to gateway 116A, to session manager 114 and finally to the client 110.

In certain examples, updates provided via 252 may only include the "top" price level for a given security or instrument. Thus, orders with hidden attributes that are not at the top price level may not be included in such updates (e.g., an order that does have the best price, but has 100k hidden quantity will not be included in an update). In certain examples, the private information that is included in the update may simply indicate that an order with private attributes exist—but not indicate the precise details of the order. For example, the information provided via the update may indicate that additional quantity is available—but not provide an exact quantity amount.

The information provided via 252 may be displayed to users on respective client compute system using a graphical user interface. The graphical user interface may show an indicator next to a price for an order (or price level) if discretion (either quantity or price) is available. The indicator may be an "*" or a "+" sign to indicate that additional "hidden" order flow is available for a given security.

The information that is included in an update communicated via the session manager may include one or more of the following fields: 1) BID/OFFER disc_lit price—tick price level in the system to which discretion is applied; 2) BID/OFFER discretion ticks—number of ticks of discretion for "discretion price": 3) BID/OFFER discretion price—Actual discretion price, for applications that don't want to compute based on discretion ticks; 4) BID/OFFER discretion size—Actual best discretion size (e.g., if this value is set to '0' it will indicate that there is no price availability for this price level).

Further, if the BID/OFFER discretion size field is greater than zero then discretion is present. But if it is set to zero then there is currently no discretion for that side at that level.

At 254, the ITCH data feed (e.g., using the ITCH messaging protocol) is propagated to client 120 via the ITCH gateway 124. However, unlike the update provided by 252, this update will not include any indication that discretion is available for the order that is displayed at 101.

At 256, client 110 has received the update 252 and then decides to generate and submit, at 258, a new order. For example, client 110 may decide to submit an order to match against the order that caused the update at 250 at a price level between the bid/offer spread. This submitted order is initially submitted to the session manager 114. In certain examples, once the session manager receives the new order it may be automatically annotated with information indicate that this order is an order that is being submitted via the session manager 114. Session manager 114 then routes that order to gateway 116A, which then routes it to exchange 110A.

Once exchange 100A receives the order, then it is processed at 260 (e.g., by the matching engine). Examples of how such processing may occur for orders that have hidden attributes is described in U.S. Publication No. 2017/0004563, the entire contents of which are hereby incorporated by reference. For example, a match may be determined at a price using the discretion attribute of the resting order.

In any event, the order book is updated 262, which triggers or causes the updates via the separate communication protocols at 264 and 266. The update that is provided via 266 may include private information regarding the just performed match (e.g., simply an indicator that the match occurred with private information or more precise information the price and/or quantity). In certain examples, the update 266 is provided to any client computer systems that are using the communication protocol used for the 266 update. In other words, the update that includes the private information may be provided to third party client computer systems (e.g., those systems that are not associated with the cause of the update to the order book at 262).

The following is an example sequence of transactions for how updates and order submissions may be realized according to the example embodiments described herein.

Initially, an order book includes a bid that publically shows 5@100. A data transaction requests is submitted that is for a non-elect order with discretion. That order is 10@100 with 1 discretion tick. The market data API (e.g., provided via the session manager) may show "15@100, BID_DISCR_LIT_PRICE=100, BID_DISCR_TICK=1, BID_DISCR_PRICE=100.0039, BID_DISCR_SIZE=10." In other words, there is 15 available at 100. Further, the data feed includes information that there is 1 discretion tick available, and 10 (of the 15) is available using the discretion tick at the indicated discretion price.

Next, another order with the same discretion is received. In the order book is a Bid showing 15@100 (with 10 M having 1 Discr tick). A new request is received for non-elect discretion order and is entered for 10@100 with 1 discretion tick. The electronic data feed will then be updated with the following information 25@100, BID_DISCR_SIZE=20. Note that in this instance the other discretion fields are not included in the update because they have not changed.

Next, another order is received with better discretion. The order book shows 25@100 (20 M with 1 Discr tick). The new request is a bid non-elect discretion for 10@100 with 2 discretion ticks. The electronic data feed is updated with the following, "35@100, BID_DISCR_TICK=2, BID_DISCR_PRICE=100.0020, BID_DISCR_SIZE=10."

Next, a counter side order is received. The order book shows 35@100 (20 M with 1 Discr tick, 10 M with 2 Discr ticks). The next order is an offer 10@100 that is executed with discretion. The electronic data feed may be updated as follows "100, BID_DISCR_TICK=1, BID_DISCR_PRICE=100.0039, BID_DISCR_SIZE=20" (basically back to a prior state). Note that volumes may be updated on a delayed basis.

Next the top level of the bid side is topped. The current state of the order book is 25@100 (20 M with 1 Discr tick). A new bid order is received for 10@100+. The electronic data feed send out updates like—"BID1 will show 10@100+, BID2 will show 25@100, BID_DISCR_SIZE=0." Here the discretion is no longer applies to the top level of the book, so the discretion size further down in the order book is, essentially, listed as zero.

The order book shows: 1) 10@100+; and then 2) 25@100 (20 M with 1 Discr tick—not displayed though). An offer is received and entered for 10@100+. This matches against the top order and executes at the full bid size. The electronic data feed is then updated as follows: BUY1 will show 0@100, BID2 shows 25@100, BID_DISCR_PRICE=100, BID_DISCR_TICK=1, BID_DISCR_PRICE=100.0039, BID_DISCR_SIZE=20.

With the order book having 25@100 (20 M with 1 Discr tick), a new non-elect order with discretion is received and entered for 20@100 with 1 discretion ticks showing 1 with a reserve of 19. The electronic data feed may be updated as follows: 26@100+, BID_DISCR_SIZE=40. Note here that the discretion price/tick has not changed, but 20 M has been added to discretion. Additionally, as this is a non-elect discretionary reserve, the reserve portion of the new order (19) is not shown on SIZE field—instead the publically visible "1" is added to the previously available 25.

In another example (not continuing with the above order book state), an order book shows 25@100 (20 M with 1 Discr tick). A new bid order is received. The new order is specified as a SessionManager Elect Reserve order and is entered for 50@100 with 1 discretion ticks showing 1 with 49 in reserve. Accordingly, the reserve aspects of this order will only be available to other orders that have been submitted using the session manager communication path. The session manager market data will then be updated to show 75@100, BID_DISCR_SIZE=70. Furthermore, the ITCH based market data feed may only be updated based on the "displayed" size (e.g., only 26 will be included in the ITCH based data feed).

Next an order modification is received for the session manager elect reserve order. The order is modified from 50@100 (1/49), to 20@100 (1/19). Basically, 30 is removed from the reserve and the market data API provided via the session manager is updated to show 45@100, BID_DISCR_SIZE=40. Note that in this instance, no updates are provided over the ITCH electronic data feed because the "public" aspects of the order have not been modified.

With the order book having order1 showing 25@100 (20 M with 1 Discr tick) and order2 showing 20 M Session-Manager Elect Reserve (for API)/1 Shown/19 Reserve (for ITCH) (e.g., the session manager API shows the top bid being 45@100), a new order is received. The new order is a SessionManager Elect order and is entered 30@100 showing 5 with 25 in reserve. The session manager market data feed will then be updated to show 70@100. In other words, the size 70@100 is changed to indicate new SessionManager Elect size. Further, at the same time, the ITCH data feed will be updated to add 5 M (the displayed size). In this example, discretion did not change so there is no update for it.

FIG. 3

FIG. 3 is a signal diagram that illustrates example timings of communication protocols used according to certain example embodiments.

In a first example, an update from exchange 100A to client 120 using the ITCH gateway 124 (300) may happen within 130 microseconds. In contrast, a second example for that same update for the same order book update using gateway 116A, session manager 114, to client 110 (302A, 302B, 302C) may occur over 600 microseconds.

A similar difference in timings is seen for order submissions where orders submitted from client 120 via FIX gateway 122 to exchange 100A (310) may take around 100 microseconds. However, orders submitted from client 110, via session manager 114 (312A), gateway 116A (312B), to exchange (312C) may take around 650 microseconds.

Naturally other timing may come about depending on the speed of communication protocols involved. It will be appreciated that the total time it takes for information to be received via the ITCH gateway and acted upon by clients in the form of an order submission via the FIX gateway (e.g., 100+130) is less than just update time for updates that occur via the session manager. In general, the techniques herein of providing hidden attribute data via a slower communication protocol (e.g., session manager updates) are beneficial when the timing for such updates is greater than the total time for acting upon updates using a faster communication protocol (e.g., receiving updates, submitting a new order based on those updates, and having it processed by the exchange).

Such benefits may be particularly relevant in multiple exchange environments where updates in one exchange may cause clients to submit orders to another exchanges (or order books). With the techniques herein, matching based on private attribute information may be restricted to those orders submitted via the slower communication protocol (e.g. using the session manager). This allows, for example, clients that have orders with private attributes to be adjusted, canceled, or otherwise modified (e.g., via the FIX gateway) before any orders can be submitted (e.g., via the session manager) that could potentially match against that order based on quick changing updates.

FIG. 4

Figure 4:
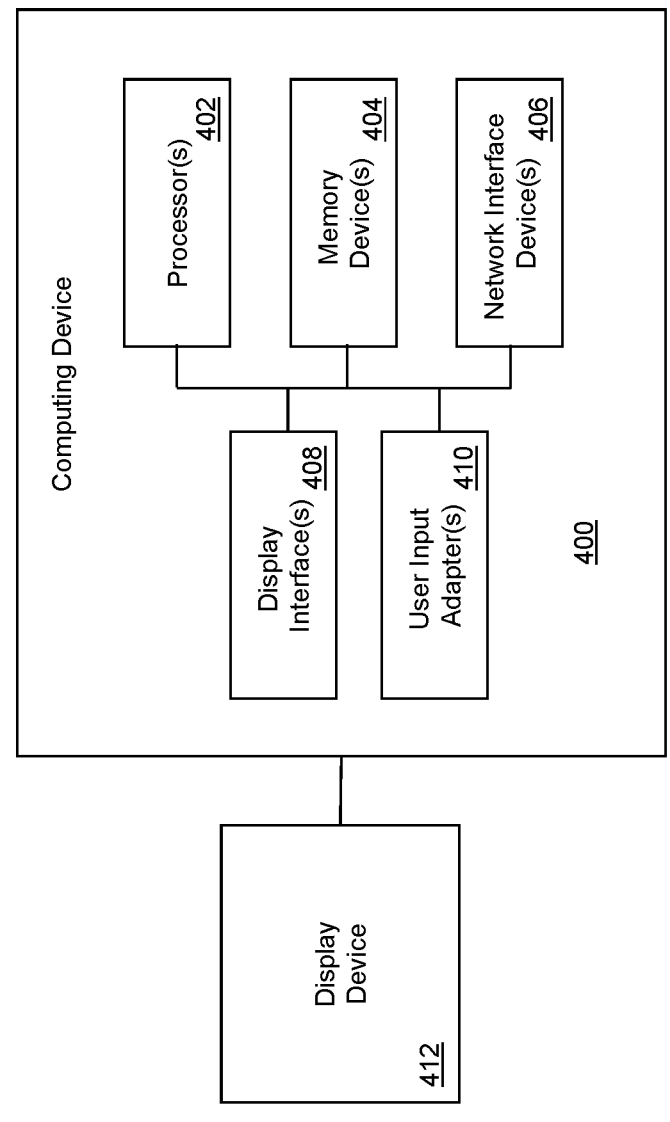
FIG. 4 is an example computer system according to certain example embodiments.

FIG. 4 is a block diagram of an example computing device 400 (which may also be referred to, for example, as a "computing device," "computer system," or "computing system") according to some embodiments. In some embodiments, the computing device 400 includes one or more of the following: one or more processors 402; one or more memory devices 404; one or more network interface devices 406; one or more display interfaces 408; and one or more user input adapters 410. Additionally, in some embodiments, the computing device 400 is connected to or includes a display device 412. As will explained below, these elements (e.g., the processors 402, memory devices 404, network interface devices 406, display interfaces 408, user input adapters 410, display device 412) are hardware devices (for example, electronic circuits or combinations of circuits) that are configured to perform various different functions for the computing device 400.

In some embodiments, each or any of the processors 402 (a hardware processor) is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 402 uses an instruction set architecture such as x86 or Advanced RISC Machine (ARM).

In some embodiments, each or any of the memory devices 404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 402). Memory devices 404 are examples of non-volatile computer-readable storage media.

In some embodiments, each or any of the network interface devices 406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 408 is or includes one or more circuits that receive data from the processors 402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 412, which displays the image data. Alternatively or additionally, in some embodiments, each or any of the display interfaces 408 is or includes, for example, a video card, video adapter, or graphics processing unit (GPU).

In some embodiments, each or any of the user input adapters 410 is or includes one or more circuits that receive and process user input data from one or more user input devices (not shown in FIG. 4) that are included in, attached to, or otherwise in communication with the computing device 400, and that output data based on the received input data to the processors 402. Alternatively or additionally, in some embodiments each or any of the user input adapters 410 is or includes, for example, a PS/2 interface, a USB interface, a touchscreen controller, or the like; and/or the user input adapters 410 facilitates input from user input devices (not shown in FIG. 4) such as, for example, a keyboard, mouse, trackpad, touchscreen, etc . . .

In some embodiments, the display device 412 may be a Liquid Crystal Display (LCD) display, Light Emitting Diode (LED) display, or other type of display device. In embodiments where the display device 412 is a component of the computing device 400 (e.g., the computing device and the display device are included in a unified housing), the display device 412 may be a touchscreen display or non-touchscreen display. In embodiments where the display device 412 is connected to the computing device 400 (e.g., is external to the computing device 400 and communicates with the computing device 400 via a wire and/or via wireless communication technology), the display device 412 is, for example, an external monitor, projector, television, display screen, etc . . .

In various embodiments, the computing device 400 includes one, or two, or three, four, or more of each or any of the above-mentioned elements (e.g., the processors 402, memory devices 404, network interface devices 406, display interfaces 408, and user input adapters 410). Alternatively or additionally, in some embodiments, the computing device 400 includes one or more of: a processing system that includes the processors 402; a memory or storage system that includes the memory devices 404; and a network interface system that includes the network interface devices 406.

The computing device 400 may be arranged, in various embodiments, in many different ways. As just one example, the computing device 400 may be arranged such that the processors 402 include: a multi (or single)-core processor; a first network interface device (which implements, for example, WiFi, Bluetooth, NFC, etc . . . ); a second network interface device that implements one or more cellular communication technologies (e.g., 3G, 4G LTE, CDMA, etc . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 400 may be arranged such that: the processors 402 include two, three, four, five, or more multi-core processors; the network interface devices 406 include a first network interface device that implements Ethernet and a second network interface device that implements WiFi and/or Bluetooth; and the memory devices 404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of clients 110/120, session manager 114 gateways 116A/ 116B/122/124, transaction processing computer systems 100A and 100B, matching engines 102A/102B, order books 104A/104B, and network interfaces 106A/106B/108A/ 108B, each of which will be referred to individually for clarity as a "component" for the remainder of this paragraph, are implemented using an example of the computing device 400 of FIG. 5. In such embodiments, the following applies for each component: (a) the elements of the 400 computing device 400 shown in FIG. 4 (i.e., the one or more processors 402, one or more memory devices 404, one or more network interface devices 406, one or more display interfaces 408, and one or more user input adapters 410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 404 (e.g., in various embodiments, in a volatile memory device such as a RAM or an instruction register and/or in a non-volatile memory device such as a flash memory or hard disk) and all actions described herein as performed by the software modules are performed by the processors 402 in conjunction with, as appropriate, the other elements in and/or connected to the computing device 400 (i.e., the network interface devices 406, display interfaces 408, user input adapters 410, and/or display device 412); (c) alternatively or additionally, to the extent it is described herein that the component processes and/or otherwise handles data, in some embodiments, such data is stored in the memory devices 404 (e.g., in some embodiments, in a volatile memory device such as a RAM and/or in a non-volatile memory device such as a flash memory or hard disk) and/or is processed/handled by the processors 402 in conjunction, as appropriate, the other elements in and/or connected to the computing device 400 (i.e., the network interface devices 406, display interfaces 408, user input adapters 410, and/or display device 512); (d) alternatively or additionally, in some embodiments, the memory devices 402 store instructions that, when executed by the processors 402, cause the processors 402 to perform, in conjunction with, as appropriate, the other elements in and/or connected to the computing device 400 (i.e., the memory devices 404, network interface devices 406, display interfaces 408, user input adapters 410, and/or display device 512), each or any combination of actions described herein as performed by the component and/or by any software modules described herein as included within the component.

Consistent with the preceding paragraph, as one example, in an embodiment where an instance of the computing device 400 is used to implement transaction processing system 100A, memory devices 404 could store data for order book 104A and executable code for matching engine 102A. Processors 402 may be used to execute the executable code for matching engine 102A. In another example, ITCH gateway 124 may be implemented as an FPGA and session manager may be implemented as a software module that is executing on a computing device 400 that is separate from the computing device executing the matching engine.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions (or FPGAs), (c) using one or more digital signal processors (DSPs) specifically configured to perform the described functions/actions, (d) using the hardware configuration described above with reference to FIG. 4, (e) via other hardware arrangements, architectures, and configurations, and/or via combinations of the technology described in (a) through (e).

Technical Advantages of Described Subject Matter

In certain example embodiments, the subject matter described herein provides for alternative communication pathways (e.g., which may include different communications protocols and/or different physical attributes, like being co-located) for communicating information from a transaction processing system to client computer systems (and from client computer systems to the transaction processing system). Certain processing options (e.g., those that rely on private attributes) are only available for data transaction requests submitted via communication pathways that are slower that a faster communication option. This dual (or more) communication pathway implementation allows client computer systems more flexibility in how data transaction requests that are resting with the transaction processing system may be interacted with.

In certain examples, providing additional information via a slower communication path can alleviate the latency stress (e.g., latency race) on client computer systems. Such latency concerns may also be alleviated due to requiring that data transaction requests be submitted through a slower communication pathway. Client systems can receive information quickly and act on that information quickly, before the newly received information can be acted upon against the private attributes of a data transaction request. This increases the stability of the transaction processing system.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Individual function or process blocks are shown in the figures. Those skilled in the art will appreciate that the functions of those blocks may be implemented using individual hardware circuits, using software programs and data in conjunction with a suitably programmed hardware, using applications specific integrated circuitry (ASIC), and/or using one or more digital signal processors (DSPs). The software program instructions and data may be stored on non-transitory computer-readable storage medium and when the instructions are executed by a computer, or other suitable hardware processor, control the computer or hardware processor to perform the functionality defined in the program instructions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A distributed computer system for processing different types of data transaction requests, the distributed computing system comprising:

a storage system configured to store a data structure that includes a plurality of pending data transaction requests, each being associated with a first side or a second side, the plurality of pending data transaction requests including a first data transaction that includes a plurality of different attributes; and memory coupled to at least one hardware processor that is configured to perform operations comprising:

sending data messages to one or more external clients using a plurality of different communication protocols;

processing a plurality of new data transaction requests that have been submitted from different external client computer systems;

as part of processing each corresponding data transaction request of the plurality of new data transaction requests:

(a) updating the data structure to a new state, wherein the updating includes adding to, modifying, or removing from the plurality of pending data transaction requests that are included in the data structure, wherein which of the adding, modifying, or removing is performed is based on content of the corresponding data transaction request that is processed;

(b) generating at least first and second update messages that each include data for how the data structure has been updated as a result of processing the corresponding data transaction request;

(c) causing at least the generated first and second update messages to be delivered to at least an external client, wherein the first update message is configured to be delivered to the external client at a first data communication path and the second update message is configured to be delivered to the external client at a second data communication path, wherein the first data communication path has less latency than the second data communication path, wherein a type of information that is included in each of the first update message and the second update message is based on a data communication path at which the first update message and the second update message is configured to be delivered to the external client; and wherein based on the updating including the modifying of one of the plurality of pending data transaction requests of the data structure, causing a third update message to be generated and delivered, using the second data communication path, to the external client, wherein no corresponding update message is delivered using the first data communication path to the external client.

2. The distributed computer system of claim 1, wherein update messages delivered via the first data communication path are delivered using the ITCH messaging protocol.

3. The distributed computer system of claim 1, wherein the operations further comprise:

modifying, based on at least one of the corresponding data transaction requests, at least one data value of the plurality of pending data transaction requests, wherein the data structure is updated based on a result of the modifying.

4. The distributed computer system of claim 1, wherein the operations further comprise:

adding, based on at least one of the corresponding data transaction requests, a new data transaction as one of the plurality of pending data transaction requests, wherein the data structure is updated based on a result of the adding.

5. The distributed computer system of claim 1, wherein the operations further comprise:

removing, based on at least one of the corresponding data transaction requests, an existing data transaction from the plurality of pending data transaction requests, wherein the data structure is updated based on a result of the removing.

6. The distributed computer system of claim 1, wherein the operations further comprise:

performing a matching process to identify a match between the corresponding data transaction request to at least one other data transaction request of the pending data transaction requests, wherein the data structure is updated based on a result of the performed matching process.

7. The distributed computer system of claim 6, wherein each of the plurality of new data transaction requests are received by the distributed computer system via one of multiple different communication pathways that operate at different speeds.

8. The distributed computer system of claim 7, wherein the operations further comprise:

identifying which of the multiple different communication pathways was used to submit the corresponding data transaction request; and based on which communication pathway is identified for the corresponding data transaction request, controlling which data of the corresponding data transaction requests and/or the pending data transaction requests is used in performing the matching process.

9. The distributed computer system of claim 8, wherein the multiple different communication pathways include a first communication pathway that that has less latency than a second communication pathway.

10. The distributed computer system of claim 9, wherein the operations further comprise:

based on identification of the second communication pathway being used for submission of the corresponding data transaction request, additional data is used in performing the matching process for the corresponding data transaction request.

11. The distributed computer system of claim 7, wherein the operations further comprise:

automatically annotating each of the plurality of new data transaction requests that are received with data that identifies which communication pathway was used in submission of the request.

12. The distributed computer system of claim 6, wherein the matching process includes identification of the match using at least one private attribute of the corresponding data transaction request or the at least one other data transaction request of the pending data transaction requests.

13. The distributed computer system of claim 12, wherein the type of information included in the second update message, but not the first update message includes data that is based on the at least one private attribute.

14. The distributed computer system of claim 13, wherein the at least one private attribute includes at least one of: 1) a total or hidden size value; 2) a discretion value; 3) a private matching value; 4) a private quantity value that is matchable at a private matching value; and 5) an automatically generated midpoint value.

15. A method performed on a computing system for processing data transaction requests, the computing system including at least one hardware processor, the method comprising:

storing, to a storage system, a data structure that includes a plurality of pending data transaction requests, each being associated with a first side or a second side, the plurality of pending data transaction requests including a first data transaction that includes a plurality of different attributes;

sending data messages to one or more external clients using a plurality of different communication protocols;

processing a plurality of new data transaction requests that have been submitted from different external client computer systems;

as part of processing each corresponding data transaction request of the plurality of new data transaction requests:

(a) updating the data structure to a new state, wherein the updating includes adding to, modifying, or removing from the plurality of pending data transaction requests that are included in the data structure; wherein which of the adding, modifying, or removing is performed is based on content of the corresponding data transaction request that is processed;

(b) generating at least first and second update messages that each include data for how the data structure has been updated as a result of processing the corresponding data transaction request;

(c) causing at least the generated first and second update messages to be delivered to at least an external client, wherein the first update message is configured to be delivered to the external client at a first data communication path and the second update message is configured to be delivered to the external client at a second data communication path, wherein the first data communication path has less latency than the second data communication path, wherein a type of information that is included in each of the first update message and the second update message is based on a data communication path at which the first update message and the second update message is configured to be delivered to the external client; and wherein when the updating includes the modifying of one of the plurality of pending data transaction requests of the data structure, causing a third update message to be generated and delivered, using the second data communication path, to the external client, wherein no corresponding update message is delivered using the first data communication path to the external client.

16. The method of claim 15, further comprising:

performing a matching process to identify a match between one of the corresponding data transaction request(s) to at least one other data transaction request of the plurality of pending data transaction requests, wherein the data structure is updated based on a result of the performed matching process.

17. The method of claim 16, wherein each of the plurality of new data transaction requests are received via one of multiple different communication pathways that operate at different speeds.

18. The method of claim 17, further comprising:

identifying which of the multiple different communication pathways was used to submit the corresponding data transaction request, wherein the multiple different communication pathways include a first communication pathway that that has less latency than a second communication pathway; and based on which communication pathway is identified for the corresponding data transaction request, controlling which data of the corresponding data transaction requests and/or the plurality of pending data transaction requests is used in performing the matching process, wherein based on identification of the second communication pathway being used for submission of the corresponding data transaction request, additional data is used in performing the matching process for the corresponding data transaction request.

19. A non-transitory computer readable storage medium storing computer readable instructions for use with a computing system that includes a processing system that includes at least one hardware processor, the computer readable instructions comprising instructions that cause the processing system to perform actions that include:

storing, to a storage system, a data structure that includes a plurality of pending data transaction requests, each being associated with a first side or a second side, the plurality of pending data transaction requests including a first data transaction that includes a plurality of different attributes;

sending data messages to one or more external clients using a plurality of different communication protocols;

processing a plurality of new data transaction requests that have been submitted from different external client computer systems;

as part of processing each corresponding data transaction request of the plurality of new data transaction requests:

(a) updating the data structure to a new state, wherein the updating includes adding to, modifying, or removing from the plurality of pending data transaction requests that are included in the data structure; wherein which of the adding, modifying, or removing is performed is based on content of the corresponding data transaction request that is processed;

(b) generating at least first and second update messages that each include data for how the data structure has been updated as a result of processing the corresponding data transaction request;

(c) causing at least the generated first and second update messages to be delivered to at least an external client, wherein the first update message is configured to be delivered to the external client at a first data communication path and the second update message is configured to be delivered to the external client at a second data communication path, wherein the first data communication path is faster than the second data communication path, wherein a type of information that is included in each of the first update message and the second update message is based on a data communication path at which the first update message and the second update message is configured to be delivered to the external client; and wherein when the updating includes the modifying of one of the plurality of pending data transaction requests of the data structure, causing a third update message to be generated and delivered, using the second data communication path, to the external client, wherein no corresponding update message is delivered using the first data communication path to the external client.

20. The non-transitory computer readable storage medium of claim 19, wherein the actions further include:

performing a matching process to identify a match between the corresponding data transaction request to at least one other data transaction request of the pending data transaction requests, wherein the data structure is updated based on a result of the performed matching process.

\* \* \* \* \*